Feb. 22, 1944.    N. E. HENDRICKSON    2,342,339
SPRING
Filed April 23, 1941    2 Sheets-Sheet 1
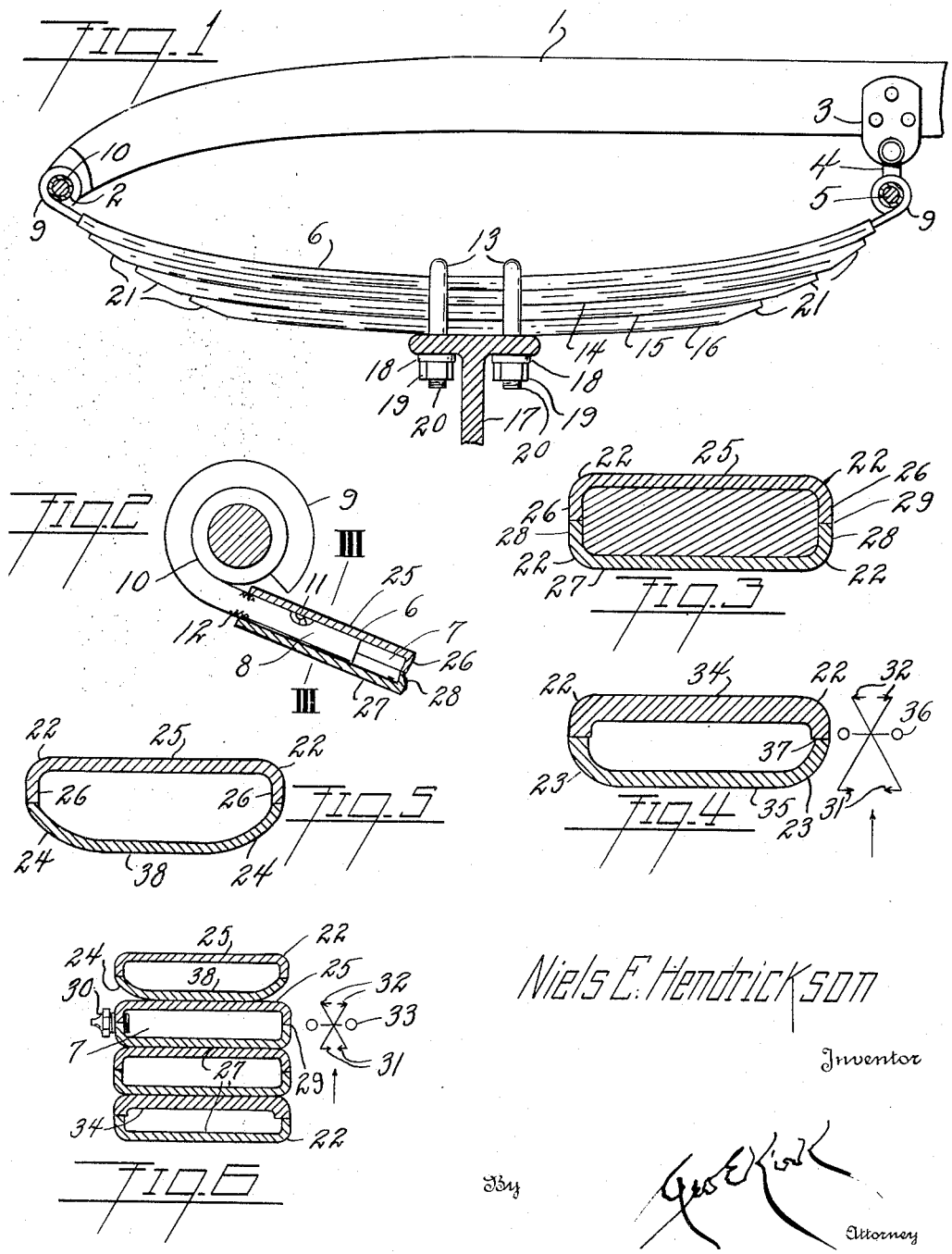

Feb. 22, 1944. N. E. HENDRICKSON 2,342,339
SPRING
Filed April 23, 1941  2 Sheets-Sheet 2
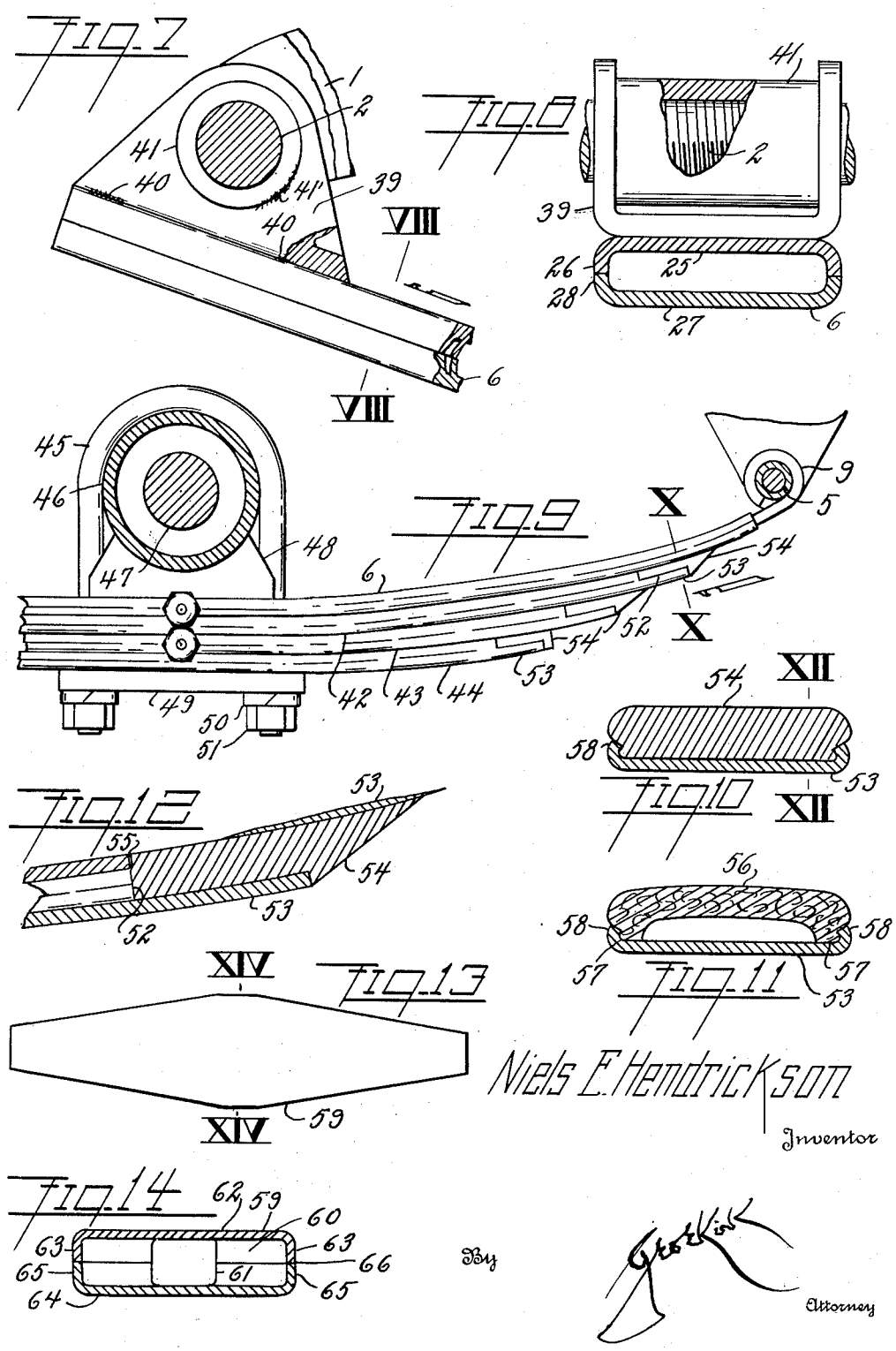

Patented Feb. 22, 1944

2,342,339

UNITED STATES PATENT OFFICE 2,342,339

SPRING

Niels E. Hendrickson, Toledo, Ohio

Application April 23, 1941, Serial No. 389,834

7 Claims. (Cl. 267—47)

This invention relates primarily to material functioning under deflection. Furthermore, this invention has to do with locating such deflectable material for appropriate range of working in tension and compression, in addition to its structural values.

This invention has utility when embodied in the manufacture of springs, especially as possessing structural properties in use. In the instance of the leaf spring in a motor vehicle, its structural attributes may be as a radius rod, a torsion take-up for brake and power action of an axle, and for stability against side sway.

The deflection of any flat section, such as the leaves of a leaf spring, normally results in maximum tension stresses on one side and maximum compression stresses on the other; these stresses gradually growing less until they become zero at the neutral axis located somewhere between the two outer surfaces. Thus, much of the intermediate material is stressed only to low values, and is therefore inefficient in its functioning.

In this invention, the greater part of the material used, say for example, heat-treated high carbon or alloy steel, desirably is located at the highly stressed regions, and these are effectively bonded or tied together by a minimum amount of material in the vicinity of the neutral axis. The result is a highly efficient spring leaf of hollow or tubular type.

Referring to the drawings:

Fig. 1 is a side elevation, with parts broken away, of an embodiment of the invention in a so-called semi-elliptic type of leaf spring for a vehicle at a front axle region;

Fig. 2 is a fragment of an eye terminus for a hollow or tubular main leaf of the spring of Fig. 1;

Fig. 3 is a section on the line III—III, Fig. 2, showing the filler from the eye and the complementary channels, flash, resistance, spot, or arc welded or bonded into unit structure tube form;

Fig. 4 is a view of the tubular leaf, spaced away from the eye filler, in which the more detrimental stress on the tension portion of the section is provided for by a heavier section than is used for the less detrimental compression stress; the compression portion having relief fillets at the corners to reduce concentration of stress at the outer corners of the tension surfaces, which would otherwise tend to occur in the section shown (Fig. 3). The accompanying diagram indicates the directions of the longitudinal stresses in such a tube;

Fig. 5 is a section of the tubular leaf, wherein the corners of the compression side approach a parabolic shape, reducing the corner stresses on the tension side resulting from deflection;

Fig. 6 is a section through a multi-element leaf spring, wherein certain conditions may warrant the use of various cross-sectional contours in one spring, the accompanying stress diagram being shown to illustrate the directions of the longitudinal stresses in one of these elements;

Fig. 7 is a fragmentary view of a welded-on bracket for an eye terminus to the main tubular spring leaf;

Fig. 8 is a section on the line VIII—VIII, Fig. 7, of a terminal mounting of the spring main leaf, parts being broken away;

Fig. 9 is a fragmentary view of a semi-elliptic or leaf spring portion for the rear axle of a motor vehicle, wherein the leaf tips have fillers;

Fig. 10 is a section on the line X—X, Fig. 9, showing a load carrying tip or filler, which appropriately may be effective not only to provide ample area, but lubrication value, when made of combined impregnated or alloyed materials;

Fig. 11 is a section of a leaf spring terminus similar to Fig. 10, wherein the insert may provide elastic adjustment of the tip area, and also be effective for lubrication, as when made of impregnated material or fabric;

Fig. 12 is a section on the line XII—XII, Fig. 10, showing the tip insert;

Fig. 13 is a plan view of a spring leaf having dissimilar cross-section for the chamber or tube therein, to approach a beam of uniform stress; and Fig. 14 is a section on the line XIV—XIV, Fig. 13.

Motor vehicle chassis 1 is shown with its terminus having pin 2. Spaced from such terminus there is provided bracket 3 with shackle 4 to carry pin 5. Main spring leaf 6 is herein shown with passage 7 therein, into the termini of which may be inserted legs 8 from eyes 9 as wraps about bushings 10 at pins 2, 5, in assembling the spring with the vehicle. This eye 9 with the leg 8 may, in its assembly, be thrust past irregularities or nubs 11, into the passage 7 for effective frictional holding and compression thereabout. Supplemental holding may be by welding or brazing 12. Intermediate the length of the spring leaf, U-bolts 13 assemble additional pre-set leaves 14, 15, 16, with front axle 17. Washers 18 and nuts 19 on threaded termini 20 complete the mounting. These supplemental or minor leaves 14, 15, 16, may have tips 21, tapered out to have a terminus of less tendency to bite into the adjacent leaf. In this set-up, the efficiency of the metal distribution may even be so great that four leaves of tubular section will do the work of six to eight leaves of the similar material in a non-tubular type of spring section. This is illustrative of the widened range hereunder for the adaptability of materials.

The applicant has substantial basis for high efficiency in the use of material:

(1) The weight of the material required for any "spring" may be obtained from the formula:

$$W = K\frac{PD}{S^2}$$

where W is the weight; K is a constant depending on the type of spring and its stressing; P is the load; D is the deflection caused by load P; and S is the stress.

(2) Spring material functioning in "pure tension" or "pure compression" is working at its maximum efficiency, i. e., all of the material is stressed the same amount. In such a spring made of steel, the weight of material required may be obtained from the foregoing formula, using for K a value of 8,500,000.

(3) Spring material functioning for deflection in "bending" does not work at maximum efficiency, because the maximum stresses exist only at the outermost surfaces of the tension and compression sides, and gradually become less until they finally are zero at the neutral axis. A spring functioning by "bending" of the material is most efficient when it is a beam-of-uniform-stress (i. e., the amount of material at any section is proportional to the bending moment). In a steel spring designed as a beam-of-uniform-stress, the weight of material may be calculated from the above formula, using for K a value of 25,600,000.

(4) Thus the most efficient beam-of-uniform-stress is working its material at one-third of its maximum possibilities, since the constant K in (2) above is only 8,500,000, whereas the constant K in (3) above is 25,600,000.

(5) As the inefficiency of spring material used in "bending" of a solid section is due to the fact that the interior or core of the section is dormant or partially inactive, the proposed new section is directed toward dispensing with inactive core material. Structurally this has been accomplished by a spreading of the outer material farther from the neutral axis. Thus it is possible for approximately all of the material along one side to approach a condition of "pure tension" and for approximately all of the material along the opposite side to approach a condition of "pure compression."

(6) Consistent with this engineering analysis, applicant has invented a "hollow" section spring leaf which may approach rectangular shape. In practice, such leaves may be somewhat wider and thicker, and the resulting springs may be longer, than in conventional springs of solid leaves. Flat tubular sections of low carbon steel (mild steel) are usually "drawn" from the raw stock. However, hollow spring leaves hereunder should be a high carbon steel, which would respond to heat treatment, in order to obtain necessary strength and "fatigue" qualities demanded in spring service. Such high carbon steel can not be "drawn" economically or satisfactorily. Accordingly, herein spring leaves are from stock not suitable for "drawing," and hollow or tubular form is obtained by additional process or treatment as disclosed hereunder.

(7) Tubular sections of high strength steel are hereunder made competitively available with current spring materials of similar strength in the development of the hollow sections from non-hollow shapes as strips, complementary channels, or modified channels. Integral longitudinal bonding by continuously welding the edges of two channel sections or strips may be by the "flash," "resistance," "spot," or "arc" process. Due to locating this weld approximately at the neutral axis, it is at the line of zero stress of the section. There is thus minimized any occasion for failure of the section at the weld. This is distinctive advance in commercially available high efficiency spring sections.

The efficiency of a tubular or hollow spring leaf may be taken in comparing with a solid bar of exactly the same material; same weight per inch, the total weight of metal for each being 1.96 pounds; working at the same deflection, 2 inches; same stress, 100,000 pounds per square inch; and same working length, 18.4 inches. In a cantilever beam, the solid bar 1 inch wide and ⅜ inch thick will deflect 2 inches under an end load of 126 pounds, with the resulting stress 100,000 pounds per square inch at the point of support. The tubular beam or hollow spring leaf bar 2¾ inches wide and ⅜ inch thick, with a wall thickness of 1/16 inch all-round, will require an end load of 252 pounds to deflect 2 inches, with a stress of 100,000 pounds per square inch. The tubular bar of the same weight and length carries twice as much load as the solid section at exactly the same stress and deflection.

A further advantage of the tubular section for leaf spring use is its resistance against "edge-bending" or edgewise distortion or resistance to side sway. A solid bar main spring leaf 2 inches wide and .237 inch thick has .1570 edgewise moment of inertia. A solid bar main spring leaf 1¾ inches wide by .262 inch thick has .1160 edgewise moment of inertia, or only 74 per cent as much as the 2 inch width, despite the fact that its weight is only 3 per cent less. The spring leaf tubular main section hereunder, 2¼ inches wide by ⅜ inches thick, with walls 1/16 inches thick all-round, has .1570 edgewise moment of inertia, the same as the solid leaf of 2 inches width and .237 inch thickness, although the weight of the tubular leaf is only 66 per cent of the weight of the solid leaf 2 inches wide and .237 inch thick.

Superior spring materials, such as high carbon and alloy steels, readily respond to heat treatment. These materials in tubular cross-section establish a stride forward for deflection-functioning practices in spring structures.

The figures, for convenience in comparison, have been adopted as of rectangular contour. In practice, fillet curvature corners 22 (Fig. 3) are primarily desirable. In the development, a larger arc 23 on the compression side (Fig. 4) is a factor contributing to further efficiency, especially on the tension side. The advantage continues to accrue in approaching parabolic form 24 (Fig. 5) on the compression side. In an embodiment of the invention as herein considered, the homogeneous metal unit is built up of a channel having web 25 and legs 26 in association with complementary channel 27 with legs 28, wherein the webs are of major extent relative to the legs. Bonded assembly, as by flash, resistance, spot or arc weld 29, establishes lineal continuity between the elements of the pair of channels, thereby completing the passage or duct 7.

In practice, pressure lubricating port 30 (Fig. 6) may supply lubricant to the chamber 7, whether such lubricant be in more or less viscous form. The lubricant discharge may be limited to oozing near the tips 21. In the instance of a tube unit of similar material channels, the upwardly acting load (Fig. 1) would tend to compress the lower web 27, diagrammatically shown for longitudinal relation thereon by arrow points 31 (Fig. 6). Simultaneously, due to the bonding 29 between the pair of channels, the opposing web 25 is under tension, as shown by arrow points 32. These points 31, acting oppositely to the points 32 in the bonded unit, establish therebetween neutral zone or point 33. This line, zone or neutral point 33 of approximately zero stress is at the intermediate or dormant region. Adequate bonding between the two regions of opposite stress is thus accomplished by the legs or flanges located in a relatively inactive zone, with the bonded or welded region 29 at or near the neutral axis.

The practice hereunder enables the spring to be readily adapted to a range of special conditions. For example, to increase resistance to the more detrimental stress in the region of tension, web 34 (Fig. 4) may be of materially more body than opposing web 35. The resulting neutral point or zone 36 consequently may approach more closely the tension member 34 than the compression member 35. The legs of the member 35 may or may not be slightly out-of-register with the weld at bonding 37 therebetween. The arcs 23 for the corners of the web 35 additionally contribute to lift in fatigue stressing of the spring element or leaf.

Special conditions may extend to a particular cross-section of a leaf or leaves in a multi-leaf spring. Crowding action from the compression member side of the tubular unit is reduced by the parabola-approaching corners 24 (Fig. 5) relatively to web 38 in its cooperation with web 25.

The main spring leaf 6 (Fig. 7) may have U-bracket 39 terminally anchored therewith by welds 40 in providing eyes for bushing 41. The bushing 41 is thread assembled with the pin 2. Welds 41' anchor the bushing 41 against shifting out of the bracket 39.

A multi-tubular leaf spring of the main leaf 6 and minor leaves 42, 43, 44 (Fig. 9), when adapted for the power or rear axle, may have U-bolts 45 clamp the spring leaves to rear axle 46 about drive shaft 47. These U-bolts 45 bring this tubular axle against cradle 48 and holding plate 49 is set thereagainst by split washers 50 and nuts 51. These tubular or chamber-providing leaf spring elements have undercut or shortened termini 52 leaving overhangs 53. In the overhang 53 may be inserted tip 54 (Fig. 12). The chamber 7 may be charged with lubricant to seep by way 55 against the companion leaf 6 for automatically lubricating the terminus of the spring leaf. The tip proper, even with absence of pressure or other lubrication in the chamber 7, may, in itself, possess lubrication characteristics when it is impregnated, or composite in its structure, or even an alloy. The alloy may include a lead. The lubricant may be of graphite in a composite mass or a more fluid lubricant impregnation in the pores of the mass. With this alloy or body of bronze, it may provide tip area efficient for defeating biting or gouging between the leaves at the terminus. In such configuration for frictional operation, the lubricant supply, whether from the passage or in the tip proper, is a factor against wear and noise or squeak.

The tip may be of less rigid material. For instance, fiber impregnation body 56 may have legs 57 to be pinned, anchored or engaged by inturned portions 58 of the legs from the web 27. This anchoring engagement for the tip may be effective even as to the metal composition 54.

Supplemental to the showing in Figs. 1 and 9, a uniform stress multi-leaf beam is approached by medially widening element 59 (Fig. 13). Its increased width for the leaf is away from the termini. This provides medially enlarged chamber 60 having small terminal opening 61 for legs of the respective eyes (Fig. 14). In clinging to the channel type of section, there is upper web portion 62 having legs 63 therefrom. This member 62 is pre-set and has from the under side an upward load action. The web 62 is under tension when lower web 64 is under compression. The web section 64 has legs 65 with resistance, flash, spot or arc weld 66 assembling the legs 63 of the pair of channels into longitudinal continuity.

What is claimed and it is desired to secure by Letters Patent is:

1. A spring leaf having a tension side of one gage, a compression side spaced therefrom of dissimilar gage, and effective tie means of continuity therebetween.

2. A multi-leaf spring including two spring leaves, one thereof providing a longitudinally extending chamber having an end forming a seat, and a fitting in said seat protruding beyond said end in forming a working area bearing on the other leaf.

3. A spring leaf having a tension web and a compression web fixed therewith and spaced therefrom to form a hollow chamber lengthwise of the leaf, said compression web being nearer the tension web at its edges than at its medial portion, said webs being spaced to complete a homogeneous leaf.

4. A multi-leaf spring including two spring leaves, one thereof extending along the other and having a chamber extending longitudinally thereof providing a hollow terminus portion, and a tip therein protruding outward beyond the terminus portion and providing bearing area for one leaf terminus on the other leaf.

5. A hollow spring leaf beam, substantially rectangular in cross section, of homogeneous heat-treated material, of approximately double the load strength at equal deflection over a solid bar of similar material, length, thickness and weight, and comprising a pair of channel sections having webs with legs toward each other, said legs being connected by continuous welding approximately along the neutral axis to tie such sections together to form a chamber of cross sectional area at least equal to the cross sectional area of the material.

6. A spring embodying a plurality of laterally adjacent hollow spring leaves, each leaf being substantially rectangular in cross section, of homogeneous heat-treated material, of approximately double the load strength at equal deflection over a solid bar of similar material, length, thickness and weight, and comprising a pair of channel sections having webs with legs toward each other, said legs being connected by continuous welding approximately along the neutral axis to tie such sections together to form a chamber of cross sectional area at least equal to the cross sectional area of the material.

7. A hollow spring leaf, substantially rectangular in cross section, of homogeneous heat-treated material, and of approximately double the load strength at equal deflection over a solid bar of similar material, length, thickness and weight, and comprising a pair of webs continuously connected to form a chamber of cross sectional area at least equal to the cross sectional area of the material.

NIELS E. HENDRICKSON.